US011531704B2

(12) United States Patent
Eadon et al.

(10) Patent No.: US 11,531,704 B2
(45) Date of Patent: Dec. 20, 2022

(54) AUTONOMOUSLY PARTITIONING DATABASE TABLES

(71) Applicant: Oracle International Corporation, Redwood Shores, CA (US)

(72) Inventors: George Eadon, Hollis, NH (US); Ramesh Kumar, Foster City, CA (US); Ananth Raghavan, San Francisco, CA (US)

(73) Assignee: Oracle International Corporation

( * ) Notice: Subject to any disclaimer, the term of this patent is extended or adjusted under 35 U.S.C. 154(b) by 0 days.

(21) Appl. No.: 16/948,303

(22) Filed: Sep. 11, 2020

(65) Prior Publication Data
US 2021/0081453 A1   Mar. 18, 2021

Related U.S. Application Data

(60) Provisional application No. 62/899,725, filed on Sep. 12, 2019.

(51) Int. Cl.
*G06F 16/901* (2019.01)
*G06F 16/903* (2019.01)

(52) U.S. Cl.
CPC .... *G06F 16/9017* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 9,489,443 B1 * | 11/2016 | Muniswamy-Reddy | G06F 16/278 |
| 2004/0243555 A1 | 12/2004 | Bolsius et al. | |
| 2005/0251524 A1 | 11/2005 | Shukla | |
| 2007/0067261 A1 * | 3/2007 | Burger | G06F 16/2272 |
| 2007/0143259 A1 * | 6/2007 | Uppala | G06F 16/24554 |
| 2008/0189239 A1 * | 8/2008 | Bawa | G06F 16/22 |
| 2009/0063396 A1 | 3/2009 | Gangarapu et al. | |
| 2009/0100069 A1 | 4/2009 | Eadon et al. | |
| 2010/0235606 A1 | 9/2010 | Oreland et al. | |
| 2011/0125730 A1 * | 5/2011 | Bordawekar | G06F 16/24532 707/718 |
| 2013/0070813 A1 * | 3/2013 | Kim | H04L 27/34 375/214 |

(Continued)

OTHER PUBLICATIONS

PCT International Search Report and Written Opinion for International Appln. No. PCT/US2020/070533, Applicant Oracle International Corporation, dated Nov. 20, 2020 (8 pages).

(Continued)

*Primary Examiner* — Christopher J Raab
(74) *Attorney, Agent, or Firm* — Vista IP Law Group, LLP

(57) ABSTRACT

What is disclosed is an improved approach to perform automatic partitioning, without requiring any expertise on the part of the user. A three stage processing pipeline is provided to generate candidate partition schemes, to evaluate the candidate using real table structures that are empty, and to then implement a selected scheme with production data for evaluation. In addition, an improved approach is described to perform automatic interval partitioning, where the inventive concept implements interval partitioning that does not impose these implicit constraints on the partition key column.

24 Claims, 18 Drawing Sheets

(56) References Cited

U.S. PATENT DOCUMENTS

| | | | | |
|---|---|---|---|---|
| 2014/0365492 | A1* | 12/2014 | Wen | G06F 16/283 707/737 |
| 2017/0017673 | A1* | 1/2017 | Kirk | G06F 16/24542 |
| 2017/0132276 | A1* | 5/2017 | Saurabh | G06F 16/24534 |
| 2020/0026695 | A1* | 1/2020 | Yan | G06F 16/278 |

OTHER PUBLICATIONS

Papadomanolakis et al. "Autopart: Automating schema design for large scientific databases using data partitioning." In: Proceedings. 16th International Conference on Scientific and Statistical Database Management. Jul. 2003 (Jul. 2003) Retrieved on Oct. 28, 2020 (Oct. 28, 2020) from http://ra.adm.cs.cmu.edu/anon/usr0/anon/usr/ftp/2003/CMU-CS-03-159.pdf entire document.

Li et al. "SMOPO-C: An autonomous vertical partitioning technique for distributed databases on cluster computers." In: Proceedings of the 2014 IEEE 15th International Conference on Information Reuse and Integration. Aug. 15, 2014 (Jun. 15, 2014) Retrieved on Oct. 26, 2020 (Oct. 28 2020) from <https://www.cs.ou.edu/~database/autoclust/documents/LiangzheLi%20IEEE%20IRI%202014.pdf> entire document.

Nehme, R., et al., "Automated Partitioning Design in Parallel Database Systems," Copyright 2011 ACM 978-1-4503-0661-4/11/06.

"Julian Dontcheff's Database Blog," Automatic Indexing in 19c, dated Feb. 18, 2019.

"Automatic Data Optimization," Oracle White Paper, dated Feb. 2019.

Nanda, A., "Autonomous Indexing," dated May 15, 2019, Oracle Magazine.

Agrawal, A., et al., "Step-by-Step Cookbook for Identifying and Tuning SQL Problems," Oracle, Copyright 2012.

Turcu, A., et al., "Automated Data Partitioning for Highly Scalable and Strongly Consistent Transactions," Department of Electrical and Computer Engineering, Virginia Tech, Blacksburg, VA, 24060, date found via Google as Mar. 15, 2013.

Sawant, M., et al., "Database Partitioning: A Review Paper," International Journal of Innovative Technology and Exploring Engineering (IJITEE) ISSN: 2278-3075, vol. 3, Issue—5, Oct. 2013.

Pavlo, A., et al., "Skew-Aware Automatic Database Partitioning in Shared-Nothing, Parallel OLTP Systems," SIGMOD'12, May 20-24, 2012, Scottsdale, Arizona, USA. Copyright 2012 ACM 978-1-4503-1247-9/12/05.

"MySQL Partitioning," MySQL Partitioning extract from the MySQL 5.6 Reference Manual, generated Aug. 13, 2020.

Agrawal, S., et al., "Integrating Vertical and Horizontal Partitioning into Automated Physical Database Design," SIGMOD 2004, Jun. 13-18, 2004, Paris, France. Copyright 2004 ACM 1-58113-859-08/04/06.

"Partitioning in Oracle Database 11g," An Oracle White Paper, Jun. 2007.

"Extreme Data Management and Performance," Oracle Partitioning, White Paper, dated Feb. 19, 2019.

Belknap, P., et al., "DBA's New Best Friend: Advanced SQL Tuning Features of Oracle Database 11g," Oracle Open World, Nov. 2007.

* cited by examiner

AUTONOMOUSLY PARTITIONING DATABASE TABLES

CROSS-REFERENCE TO RELATED APPLICATIONS

The present application claims the benefit of priority to U.S. Provisional Application No. 62/899,725, filed on Sep. 12, 2019, which is hereby incorporated by reference in its entirety.

FIELD

This disclosure concerns a method, a computer program product, and a computer system for implementing partitioning in a data processing system.

BACKGROUND

Data processing systems, such as database management systems (DBMSs) and relational database management systems (RDBMSs), allow applications running on clients (e.g., workstations, personal computers, or remote computing terminals) to access data stored in databases located at one or more database servers. Database servers may be interconnected by a network. This network may also connect one or more clients to the database servers, allowing the clients to submit queries and requests to perform operations on the data stored at the database servers via the network.

Tables stored in databases may be divided or "partitioned" into smaller parts or "partitions." Tables may be partitioned according to various partitioning strategies, such as range partitioning, hash partitioning, and list partitioning. For a given table, each row may be assigned to a single partition based on a table partitioning key, which corresponds to one or more columns that are used to determine the partition to which each row will be assigned.

Partitioning large tables provides several advantages, including improved query performance. Executing a query directed to a partitioned table in a partition-wise manner (i.e., on a partition-by-partition basis) may be faster than executing the same query directed to the table absent partitioning since partition-wise execution limits the amount of data to be examined or operated on, allowing for query performance to be improved via parallel execution and/or partition pruning. For example, to execute a query directed to a partitioned table, a query coordinator process may assign different partitions of a table to each of multiple slave processes. In this example, the slave processes may execute the query in parallel over the partitions to which they are assigned and return the results back to the query coordinator process, which coordinates the results and sends them back to a client from which the query originated. Partition pruning may also improve query performance for queries directed to partitioned tables by removing or "pruning" unneeded partitions (e.g., partitions containing partition keys that are irrelevant to a query) from processing, which further reduces the amount of data required to be examined or operated on.

Additional advantages of partitioning large tables include enhanced manageability and availability of large amounts of data. For example, rather than performing maintenance operations on a large table, by partitioning the table, database administrators may perform maintenance operations on each partition, which is often a more manageable chunk of data with which to work. In this example, by performing the maintenance operations in small batch windows, scheduled downtime may be reduced, enhancing data availability. Furthermore, partitioning may also enhance data availability in situations in which different partitions of a table are stored in separate tablespaces on different storage tiers. In such situations, if one partition becomes unavailable, the other partitions may remain available, allowing queries to continue to be processed over these partitions.

The problem addressed by the present disclosure is that while partitioning is widely used in database systems to improve performance, it is very difficult for ordinary users to be able to implement partitions in an effective and optimal manner. Inefficiencies and wasted computing resources may occur if the user makes a mistake with a partition implementation, for example, by creating too many partitions, too few partitions, using the wrong partitioning scheme, or using the wrong partitioning keys/criteria. In fact, current solutions mostly rely upon the existence of expert users that take on the task of manually partitioning tables, hoping that the expert user is "expert" enough to be able to generate a usable and non-harmful partitioning approach. This type of reliance upon the existence of an expert user is not robust enough of a solution to be universally applicable, and thus there is a need for an improved approach to implement partitioning for data processing systems.

SUMMARY

Embodiments of the present invention provide a method, a computer program product, and a computer system for implementing partitioning in a data processing system without requiring any expertise on the part of the user. A three stage processing pipeline is provided to generate candidate partition schemes, to evaluate the candidate using real table structures that are empty, and to then implement a selected scheme with production data for evaluation.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

As noted above, the problem addressed by this disclosure is that manual implementations of partitions are often fraught with possible issues and mistakes, and is something that is conventionally only done by an expert user. To address this problem, embodiments of the present invention provide an approach for autonomously implementing partitioning in a data processing system without requiring any expertise on the part of the user.

Figure 1:
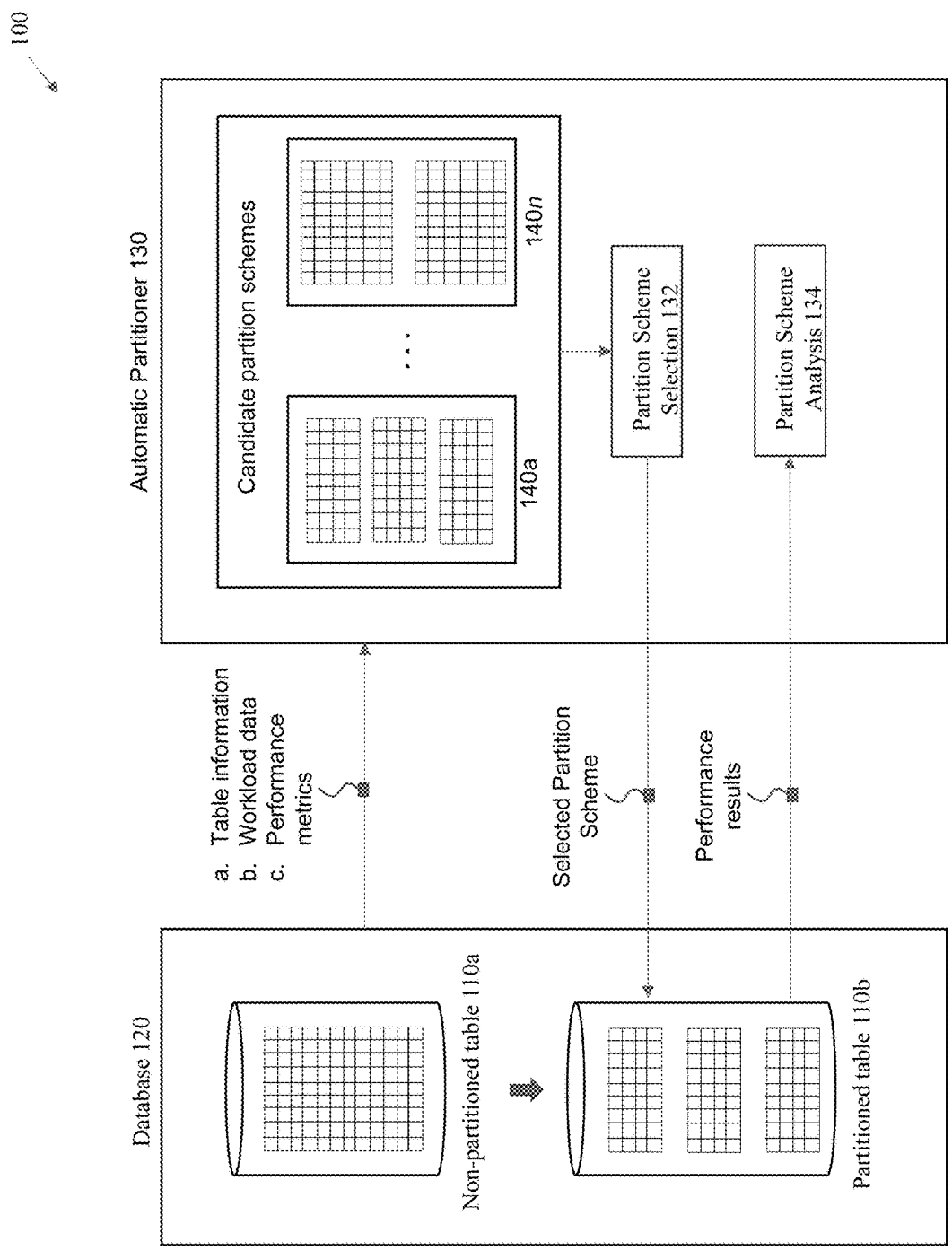
FIG. 1 illustrates a system for implementing some embodiments of the invention.

FIG. 1 illustrates a system for implementing some embodiments of the invention for autonomously implementing partitioning in a data processing system. System 100 (which may be implemented as a database management server) includes a database 120 having one or more tables that are operated upon by one or more clients within the system. One or more users at the clients may operate a user station to issue commands to be processed by the database 120 upon the tables. The user stations and/or the servers that host the database comprises any type of computing device that may be used to implement, operate, or interface with the database system 100. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

Interactions occur with a database by submission of commands that cause the database to perform operations on the database data. For the database server to process the commands, the commands typically conform to a database language supported by the database server. An example of a commonly used database language supported by many database servers is known as the Structured Query Language (SQL).

When a database server receives the original statement of a database command (e.g., from a database application), the database server must first determine which actions should be performed in response to the database command, and then perform those actions. A query processor may process the database statement to prepare the acts necessary for performance of the desired actions within the database. The initial action to analyze and break the database statement into its constituent parts may be referred to as a "parsing" the database command. "Compilation" of the database command may then be performed to create the specific composition and sequence of actions to take against delineated set(s) of database objects, as well as code generation that may be necessary to create an executable version of the database statement. Since there may be multiple alternative processing paths that can be taken to achieve the same result within a database, "optimization" may be performed to identify specific processing paths that can be selected to improve the efficiency of processing for the database command. The actual performance of the actions applied to the database is generally referred to as "executing" the database command.

As shown in the figure, the database may include one or more non-partitioned tables 110a. There are numerous optimizations and advantages that may exist if the non-partitioned tables 110a can be converted into partitioned tables 110b, since partitioning may provide tremendous benefit to a wide variety of applications by improving performance, manageability, and availability. It is not unusual for partitioning to improve the performance of certain queries or maintenance operations by an order of magnitude. Moreover, partitioning can greatly simplify common administration tasks.

For example, partition pruning can be applied to provide substantial improvements to performance in a database system. If a database query is issued against a table and the query contains a search term that is limited by a certain range or value corresponding to a partitioning criteria, then only partitions having the desired range or value are searched; all other partitions outside the desired range are pruned from the search. Partition pruning can often improve query performance by several orders of magnitude. For example, suppose an application contains a table containing a historical record of orders, and that this table has been partitioned by week. A query requesting orders for a single week would only access a single partition of this orders table. If the orders table had 2 years of historical data, then this query would access one partition instead of 104 partitions, which could potentially allow the computing system to execute 100 times faster simply because of partition pruning.

Partitioning can also improve the performance of multi-table joins by using a technique known as partition-wise joins. Partition-wise joins can be applied when two tables are being joined together and both tables are partitioned on the join key, or when a reference partitioned table is joined with its parent table. Partition-wise joins break a large join into smaller joins that occur between each of the partitions, completing the overall join in less time while also reducing space requirements. This offers significant performance benefits both for serial and parallel execution.

Partitioning also allows tables and indexes to be partitioned into smaller, more manageable units, providing database administrators with the ability to pursue a "divide and conquer" approach to data management. With partitioning, maintenance operations can be focused on particular portions of tables. For example, a database administrator could back up a single partition of a table, rather than backing up the entire table. For maintenance operations across an entire database object, it is possible to perform these operations on a per-partition basis, thus dividing the maintenance process into more manageable chunks. An example use of partitioning for manageability is to support a "rolling window" load process in a data warehouse. For example, consider if a DBA loads new data into a table on a weekly basis. That table could be partitioned so that each partition contains one week of data. The load process is simply the addition of a new partition using a partition exchange load, where adding the single partition is much more efficient than modifying the entire table, since the DBA does not need to modify any other partitions.

Partitioned database objects also provide partition independence. This characteristic of partition independence can be an important part of a high-availability strategy. For example, if one partition of a partitioned table is unavailable, then all of the other partitions of the table remain online and available. The application can continue to execute queries and transactions against the available partitions for the table, and these database operations will run successfully, provided they do not need to access the unavailable partition.

In many database systems, the database administrator can also specify that each partition be stored in a separate tablespace, where the tablespaces are stored on different storage tiers. Storing different partitions in different tablespaces allows the database administrator to perform backup and recovery operations on each individual partition, independent of the other partitions in the table. This allows the active parts of the database to be made available sooner so access to the system can continue, while the inactive data is still being restored. Moreover, partitioning can reduce scheduled downtime. The performance gains provided by partitioning may enable database administrators to complete maintenance operations on large database objects in relatively small batch windows.

With embodiments of the invention, an automatic partitioner 130 operates in system 100 to implement automatic partitioning of the non-partitioned tables 110a. In particular, the automatic partitioner 130 receives certain information regarding the non-partitioned tables 110a. For example, some embodiments gather information such as data about the table itself (e.g., size of table, table schema information, and tables statistics such as cardinality statistics), information about the workloads that are applied against the table (e.g., SQL statements that are applied to the table as part of a user workload as well as explanations of the execution plans that are used for the SQL statements), and information about performance metrics captured from running the workload against the non-partitioned tables 110a.

The automatic partitioner 130 uses the gathered information to generate multiple candidate partition schemes 140a-n. Each of the multiple candidate partition schemes 140a-n pertains to a different approach to potentially partition a non-partitioned table 110a into a partitioned table 110b. The candidate partition schemes 140a-n may encompass different partitioning approaches that include different types of partitioning, as well as partitioning based upon different columns (e.g., partition key(s)) within a given table.

A partition scheme selector 132 operates to select from among the multiple candidate partition schemes 140a-n to select one of the candidate schemes that is projected to provide the best system performance. It is noted that at this stage, the candidate partition schemes 140a-n are not yet implemented as fully populated tables having all of the production data from the tables in the main database system. Instead, as will be described in more detail below, the candidate schemes are at this stage implemented as real tables that are currently empty, where synthesized statistics are used to project and estimate the expected performance of each candidate scheme.

The selected partition scheme would then be actually implemented within the database system, where a new partitioned table is created and populated with real production data. The actual user workload would be run against the populated partitioned table to gather real-world performance results from application of the selected partitioning scheme and these results are compared against the performance of the previously non-partitioned database table. The selected partitioning scheme can then be either validated as successful, or backed out if unsuccessful. In one embodiment, if successful, the partitioning is applied to the user's table, whereas if rejected, the "back out" process is to drop the new table.

The input to the current approach is a workload and name of the table to partition. It is assumed that the system includes accurate statistics for the table under partitioning, and that one can query the tables referenced in the workload.

Figure 2:
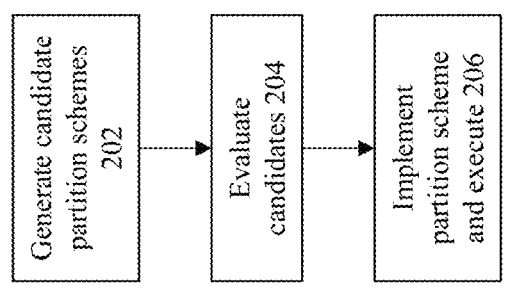
FIG. 2 shows a flowchart of an approach to implement some embodiments of the invention.

FIG. 2 illustrates a high-level flowchart of an approach to implement some embodiments of the invention. As shown in this figure, the approach is set up as a 3-stage pipeline. At stage 202, the process generates multiple candidate partition schemes. As previously noted, each of the candidate partition schemes may encompass different partitioning approaches that include different types of partitioning. The specific manner in which partitioning is implemented is generally referred to as a "partition scheme". A partition scheme is described by (a) a partition method, (b) a partition key column, and (c) a set of partition bounds. It is this combination of a method, key, and bounds that defines a partition scheme. Therefore, modification of at least one of these items creates a distinct and separate partition scheme.

Any number of different partitioning methods may be applied to partition a database object/table, such as: (a) range partitioning, (b) hash partitioning, or (c) list partitioning. Each of these methods functions as a data distribution method that controls how data is placed into individual partitions, where each row in a partitioned table is unambiguously assigned to a single partition.

Range partitioning maps data to partitions based on ranges of values of the partitioning key that is established for each partition. This is a very common type of partitioning and is often used with dates. For example, for a table with a date column as the partitioning key where the partition bounds are configured to correspond to different monthly partitions, the "January-2018" partition would contain rows with partitioning key values from 1-Jan.-2018 to 31-Jan.-2018.

Hash Partitioning is used to map data to partitions based on a hashing algorithm that is applied to the partitioning key. If designed properly, the hashing algorithm evenly distributes rows among partitions (e.g., hash buckets), giving partitions approximately the same size. As such, this type of partitioning is a good method to distribute data evenly across storage/processing devices.

List partitioning permits explicit control over how rows are mapped to partitions by specifying a list of discrete values for the partitioning key in the description for each partition. The advantage of list partitioning is that this approach can group and organize unordered and unrelated sets of data.

The partitioning key is referenced by each of the partitioning methods, and is comprised of one or more columns that determine the partition where each row will be stored. The database will automatically implement insert, update, and delete operations to the appropriate partition through the use of the partitioning key.

The partition bounds specify values for the partition key which corresponds to how the rows are mapped to the different partitions. For example, for list partitioning, the bounds may one or more specific values that correlate to a given partition. As another example, with regards to range partitioning, each partition may have a "VALUES LESS THAN" clause, which specifies a non-inclusive upper partition bound for the partition. Any values of the partitioning key equal to or higher than this literal are added to a higher partition. There may be multiple higher partitions, and the value higher than PART1's bound may go into PART2 or PART3 or PARTn. All partitions, except the first, have an implicit lower partition bound specified by the "VALUES LESS THAN" clause of the previous partition. A "MAXVALUE" data item can be defined for the highest partition, with this data item representing a virtual infinite value that sorts higher than any other possible value for the partitioning key.

At stage 204, the process evaluates the different candidate partition schemes. As previously noted, the candidate schemes at this stage are implemented as real tables that are currently empty, where synthesized statistics are used to project and estimate the expected performance of each candidate scheme. Therefore, the actual workload can be compiled and used in combination with the synthesized statistics to estimate the performance of each of the candidate partition schemes.

For example, one approach that can be taken is to use the synthesized statistics, analyze the compiled workload against the candidate partitioned tables to estimate the amount of I/O that is expected to be performed for each candidate partition scheme when operated upon by the customer workloads, and to identify the candidate partitioning scheme that would be expected to generate the lowest total I/O.

At stage 206, the process implements a selected partition scheme within the database. The actual workload is executed to quantify the real performance of the workload against the real data that has been populated within the implemented table partitions. In a current embodiment, measured performance is used to check, for example, for one or more of the following: (a) verify and quantify any benefits from partitioning; and/or (b) verify that no queries in the workload regress.

The first and second stages are used to identify the suggested partition scheme, and in some embodiments, can be run without the third stage to get a suggestion without actually implementing the suggestion. The suggestion phase could be run periodically, each time with the latest workload and table statistics. Then, when the suggestions converge (e.g., a candidate is considered to be good N times in a row), the process/user can then choose to proceed with the third stage. After accepting a candidate scheme, one could continue to run the suggestion phase periodically to check that the selected scheme remains a good choice as the workload evolves.

It is noted that any of the above processing actions may be implemented either in a production environment or in a test environment. Only the final stage to actually implement a partition scheme that is deemed beneficial and acceptable needs to be implemented in a production environment (as a replacement for an existing table in the production environment).

Figure 3:
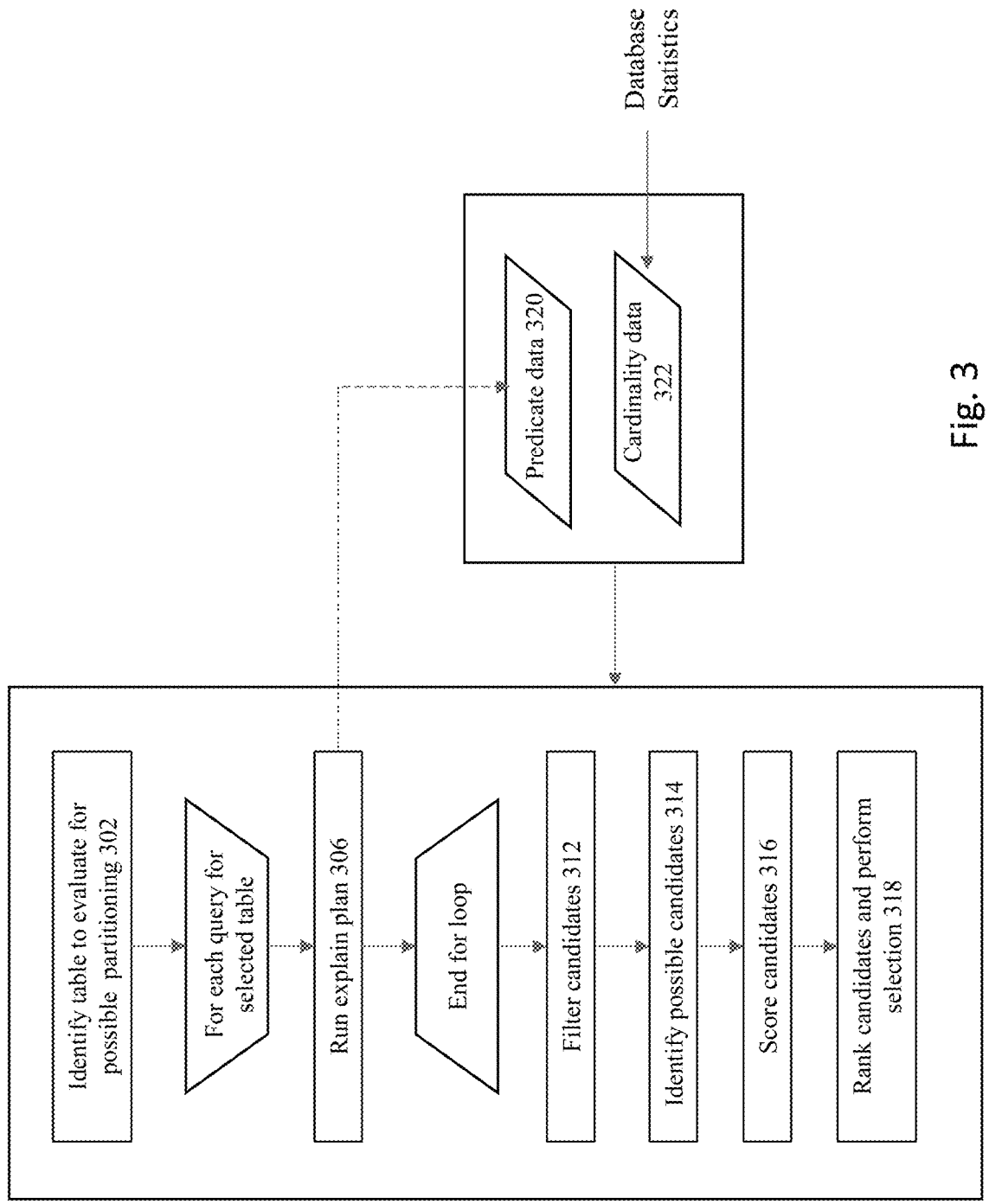
FIG. 3 shows a flowchart of an approach to generate the multiple candidate partition schemes according to some embodiments of the invention.

FIG. 3 shows a flowchart of an approach to generate the multiple candidate partition schemes according to some embodiments of the invention. At 302, one of the tables within the database is identified for possible partitioning. Any suitable approach can be taken to identify a table for evaluation at this stage. For example, one approach is to exclude any tables that have already been partitioned in a particular way by the user. Another approach is to select the table having the largest size (e.g., based upon number of rows/quantity of data) that is currently not partitioned.

In some embodiments, costs to implement partitioning (e.g., costs to move data within the system to implement a given partitioning scheme) may be balanced against possible gains from implementing a new partitioning scheme in order to select a table for the auto-partitioning process. The return on the investment of any costs to implement partitioning is likely to be recovered more quickly by efficiency gains for tables that are accessed more frequently, whereas a table that is not accessed very frequently may not be worth the effort and expenditure of resources to partition that little-accessed table. Therefore, some embodiments may consider historical access patterns for tables to project future anticipated usage and to identify the specific tables that are likely to provide the greatest efficiency gains for selection for partitioning.

Any suitable approach can be taken to initiate the partitioning process to identify a table for auto-partitioning. One possible approach is to have a user manually identify a table for partitioning. Another approach is to automatically recognize and auto-trigger the partitioning process. For example, for a table that is not currently partitioned, the process may be triggered by recognition of the table as reaching a designated threshold size, receiving a threshold number of queries in a workload against that table, or any other factor or combination of factors that would be indicative of a table that could potentially benefit from partitioning. For a table that is already partitioned, the process may be triggered, for example, if the number of partitions for the table has reach a threshold number that is deemed as excessive, if the size of a single partition has reached a threshold size, and/or any other factor or combination of factors would be indicative of a table that could potentially benefit from re-partitioning. In addition, the database schema could be configured to establish blacklist and/or whitelist parameters to designate specific tables that either should or should not be addressed by the auto-partitioning process.

Next, an identification is made of the queries within user workloads that actually reference the selected table. For example, within database products provided by Oracle Corporation, a database object referred to as the "SQL Tuning Set" or "STS" can be referenced to identify the set of SQL statements that pertain to a given database table. The STS may include multiple items of information used by the automatic partitioner, such as for example, (a) a set of SQL statements, (b) any associated execution context such, such as the user schema, application module name(s) and action(s) list of bind values, and the environment for SQL compilation of a related cursor, (c) associated basic execution statistics, such as elapsed time, CPU time, buffer gets, disk reads, rows processed, cursor fetches, the number of executions, the number of complete executions, optimizer cost, and the command type, and/or (d) associated execution plans and row source statistics for each SQL statement. Any queries that do not pertain to the selected table are pruned from consideration at this point.

For each of the queries that pertain to the selected table, at step 306, the execution plan for the query is obtained and reviewed. For example, within database products provided by Oracle Corporation, an "EXPLAIN PLAN" approach can be used to identify and review execution plans. This command identifies execution plans chosen by a database optimizer for implementing a SQL statement. A statement's execution plan is the sequence of operations that the database performs to run the statement. The row source tree is the core of the execution plan. It shows the following information: (a) an ordering of the tables referenced by the statement, (b) an access method for each table mentioned in the statement. (c) a join method for tables affected by join operations in the statement, and/or (d) data operations like filter, sort, or aggregation. In addition to the row source tree, the plan table may contains information about one or more of the following: (a) optimizations, such as the cost, and cardinality of each operation, (b) partitioning, such as the set of accessed partitions, and/or (c) parallel execution, such as the distribution method of join inputs. In some embodiments, the output of just the parsing action may provide sufficient information without needing to undergo the entire Explain Plan procedure.

Columns that are frequently used in predicates are good candidates for the partition key. This is because columns that are used in highly selective predicates are typically the best candidates, since they may provide the best performance improvements with correct partitioning. However engineering effort is typically required to obtain predicate selectivity, especially for join predicates.

Therefore, some embodiments of the invention identify and generate a count of predicates within the SQL statements, where the predicate counts are then used to find candidate partition keys. The EXPLAIN PLAN functionality can be used to provide predicate information for each statement, which explains each query in the workload once, then uses the query's execution count to compute the number of table scans executed with each predicate. At this point, predicate data 320 has been generated, which identifies the set of all predicates for each of the pertinent SQL statements.

It is noted that cardinality data 322 for the database objects within the database may also be used in embodiments of the current invention. Data cardinality refers to the number of distinct values that are in a given column. The cardinality information is useful for determining which type of partitioning should be applied to a specific column. In some embodiments, the cardinality data 322 that is used in the current invention may be obtained from the database statistics already being maintained and used by the database system's query optimizer.

At 312, a set of rules may be used to perform an initial filtering step to remove less-optimal candidate schemes. For example, as a general matter, if the cardinality of a column is too low (e.g., lower than a specified threshold), then hash partitioning would be a non-optimal choice and hence may be filtered from consideration. This is because this approach would not provide good distribution over the hash buckets. On the other hand, if the number of unique values is too high (e.g., higher than a specified threshold), then list partitioning would be a non-optimal approach to implement partitioning, since this would result in too many partitions relative to the volume of data.

At 314, a set of candidate partitioning schemes can now be identified based at least upon the predicate and cardinality information. For each column, the approach in some embodiments considers several possible partition methods, including interval/range partitioning, hash partitioning, and list partitioning. The candidate partition schemes are generated based at least upon two factors, including (a) the set of predicates in the queries, and (b) the number of distinct values within a given column. For example, for an equality predicate, any of the partitioning approaches may be used as appropriate with careful consideration of the cardinality data. As another example, for a range predicate, either range partitioning or list partitioning may be used, but hash partitioning may be less optimal.

Interval partitioning (also referred to as range partitioning) is considered if the partition key is a type that lends itself to a range of values, and particularly if the predicate is a range-based predicate against that partition key. By way of examples, partition keys such as DATE, TIMESTAMP, or the NUMBER data type may often be suitable for interval partitioning. Interval partitioning requires the system to specify a bound for the first partition, which acts as an anchor for computation of other partitions, and the size of the interval. In some embodiments, for DATE and TIMESTAMP data types, the approach queries the table to get the first percentile values for the partition key (thus discarding outlier values), e.g., where an interval size is always 1 month, and the first partition bound is the 1st percentile rounded up to the 1st of the month. For NUMBER data types, the approach queries the table to get 1st and 99th percentile values for the partition key (thus discarding outlier values); the interval size is (99th percentile−1st percentile)/N, rounded to 2 significant digits. The N in here is a parameter to control the number of partitions for the table. In one embodiment, N is computed based at least in part on the size of the table. For example, N may be configured where N=(size of table/10 GB); if N<8 then N=8; if N>1024 then N=1024. The first partition bound is the 1st percentile rounded up to a multiple of the interval.

It is noted that certain approaches to implement interval partitioning may have limitations that prevent them from being used autonomously in cloud environment where data is unpredictable. Specifically, the interval partition key in certain implementations cannot be NULL and may have an implicit high bound. As discussed in more detail below with respect to FIGS. 8 and 9, some embodiments of the invention implement interval partitioning using a virtual column and LIST AUTOMATIC partitioning to address these issues.

In some embodiments, hash partitioning is considered if a column has greater than or equal to a certain number of distinct values (e.g., 64 distinct values), and there are equality predicates on the column. In an embodiment, if the number of unique values is greater than 32, then the process would consider hash partitioning as an option. However, in certain embodiments, hash partitioning is not considered if only range predicates are identified for this column.

List partitioning is considered in some embodiments if a column has a number of distinct values within an acceptable range (e.g., at least 4 and at most 128 distinct values). This range provides a reasonable distribution of data over a defined set of partitions. In some embodiments, if the number of unique values is less than 64, then the process would consider list partitioning as an option.

At step 316, a score is identified for each of the different candidate partition schemes. At step 318, the candidates are ranked based upon their respective scores, and the list of candidates is pruned so that only a subset of the candidates proceed to the next stage for more detailed analysis and consideration.

With respect to scoring, one approach is to look at how many types of predicates are associated with a given column within the table, and to use that information to score any associated partition schemes that are based upon those predicate types for the specified column. This type of calculation can give an indication for the level of efficiency to be obtained by implementing certain types of partitions for a column. For instance, if there is only a single predicate for a first column, but there are a hundred predicates for a second column, then it is likely that partitioning will produce more effective results for the second column as compared to the first column.

Figure 4:
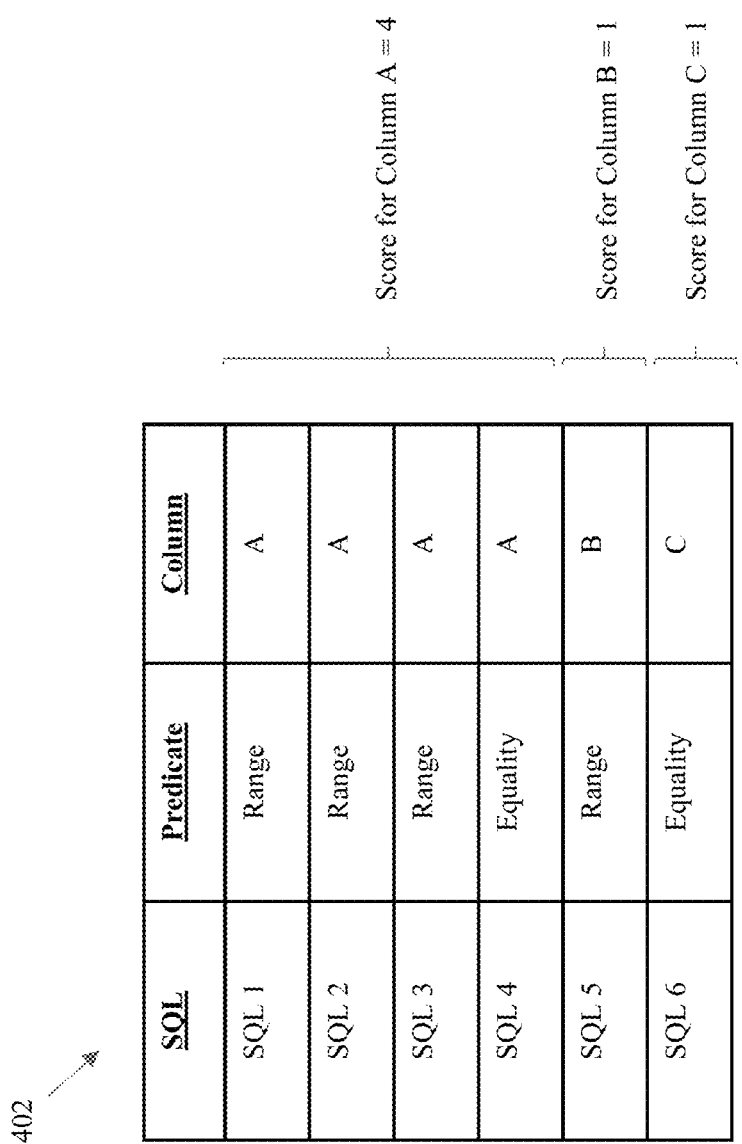
FIG. 4 shows example information about queries for a table under consideration that provides information useful for generating scoring for different candidates.

FIG. 4 shows an example table 402 of information about queries for a table under consideration that provides information useful for generating scoring for different candidates. Each of the rows identifies a different predicate within a SQL statement that pertains to a column within the table. Here, the first four rows of the table identify various SQL statements (SQL 1-4) and predicates that pertain to column A, the fifth row identifies a SQL statement (SQL 5) having a predicate that pertains to column B, and the sixth row identifies a SQL statement (SQL 6) having a predicate that pertains to column C.

Assume that a first candidate partition scheme has a partition key corresponding to Column A and uses a partition type that corresponds to the predicates for the first four rows (SQL 1-4). In this situation, a score of "4" may be given to the candidate to identify the fact that there are four predicates associated with this candidate partition scheme. Assume that a second candidate partition scheme has a partition key corresponding to Column B and uses a partition type that corresponds to the predicate for the fifth row (SQL 5). In this situation, a score of "1" may be given to the second candidate to reflect the fact that there is a single predicate associated with this candidate partition scheme. Similarly, assume that a third candidate partition scheme has a partition key corresponding to Column C and uses a partition type that corresponds to the predicate for the sixth row (SQL 6). In this situation, a score of "1" may also be given to the third candidate to reflect the fact that there is a single predicate associated with this candidate partition scheme. In this situation, the candidates may be ranked based upon their scores, and the first candidate associated with column A would receive the highest score due to this candidate being associated with the greatest number of predicates. It is noted that in some embodiments, the above predicate counts may be weighted by execution counts of the SQL.

Figure 5:
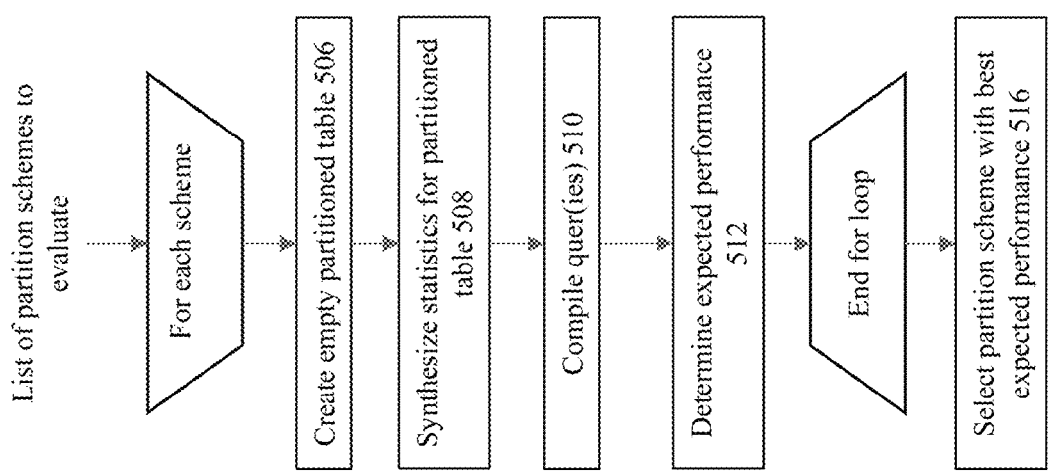
FIG. 5 shows a flowchart of an approach to implement an evaluation phase for the candidate partition schemes.

Based upon their respective scores, the top n partition schemes are evaluated in the evaluation phase. FIG. 5 shows a flowchart of an approach to implement an evaluation phase for the candidate partition schemes. For each of the candidate partition schemes, the process at step 506 creates an empty partitioned table, with columns, indexes, and constraints cloned from the original table. Since an empty table is being created, this means that no data segments are allocated for the empty table. The approach materializes partitions for interval and automatic list candidates to match the data in the original table. This may be implemented, for example, by creating an empty partitioned table as a clone of the original table using DDL "create table for exchange." This DDL takes care of cloning the table with exact column properties, as well as copying constraints. In addition, this DDL in some embodiments also clones the indexes on the original table as well. This creates an empty partitioned table with an exact replica of columns, constraints and indexes.

Next, at step 508, statistics are synthesized for the empty partitioned table, its partitions, its columns, and its indexes. Since the process is working with empty partitioned tables, this means that even though these are real tables that have been created and exist in the database's data dictionary, the entirety of the actual data from the original non-partitioned tables are not copied into these tables at this stage—hence the reference to these table as being "empty". Without having the real data at hand, the database engines (e.g., the database optimizer) will need to have some set of data that can be acted upon to evaluate these empty tables. For the current embodiment, this means that statistics are "synthesized" to provide this data for the optimizer to act upon.

In some embodiment, statistics are synthesized for the empty partitioned table where table statistics are copied from the original table—but constructed in the context of the partition structure of a respective candidate partition scheme. This may be accomplished, for example when using database products available from Oracle Corporation, by using commands such as DBMS_STATS.GET_TABLE_STATS and DBMS_STATS.SET_TABLE_STATS.

The partition statistics are constructed as a fraction of the original table's statistics, for example when using database products available from Oracle Corporation, by using the DBMS_STATS.GET_TABLE_STATS and DBMS_STATS.SET_TABLE_STATS commands. In operation, a query is run to identify the number of rows in each partition and number of rows in the entire table. Thereafter, the scale factor for statistics is "number_of_rows_in_partition/number_of_rows_in_table." Scaling may be performed for numerous attributes, such number of rows (numrows), number of blocks (numblks), and/or the cache blocks (cachedblk) attributes.

Column statistics may be copied from the original table, using DBMS_STATS.GET_COLUMN_STATS and DBMS_STATS.SET_COLUMN_STATS. Index statistics are copied from the original indexes, using DBMS_STATS.GET_INDEX_STATS and DBMS_STATS.SET_INDEX_STATS.

It is noted that in some embodiments, the statistics do not need to be adjusted for change in rowid length. For example, index on non-partitioned table will have 6 byte rowid, and global index on partitioned table will have 10 byte rowid, but the current approach will use the same statistics for these two indexes.

An additional filtering action may occur to remove any candidates from consideration having sub-optimal results that are identifiable from the statistics synthesis process. For example, after synthesizing the statistics, the process may optionally be configured to reject candidates that would result in more than 1/3 of the rows going into one partition.

This is to avoid performance problems because of partition skew, and possibly maintainability problems due to a large segment size.

At this point, the user workload can be compiled and the workload's performance estimated by the optimizer against the partitioned tables having the synthesized statistics (510). One issue to be faced is that the SQL statements in the workload may be referencing the original table objects, rather than the newly created table objects corresponding to the candidate partition scheme. One approach to address this issue is to provide a mechanism to automatically translate one table name to another table name during SQL compilation. This mechanism is set up to translate the original table name to the name of the empty partitioned table. Then, SQL performance analysis is used to compile each query in the workload. An I/O cost computation can be generated during the SQL performance analysis (512).

Once the SQL performance analysis finishes, then the process obtained the total estimated I/O for the workload, weighted by execution count, and this is used as the score for the candidate method. In some embodiments, a conventional IO_COST metric is not used to evaluate the candidate partition schemes since they may not account for certain partition pruning methods such as subquery pruning or bloom pruning. Therefore, some embodiments may employ a custom IO_COST metric for table scans on the empty partitioned table, where the IO_COST is calculated as a metric that is stored in the plan. The metric may be calculated by finding all partitions that will be accessed in the table, where the process will peek at binds to find the set of partitions that are accessed. Then, using partition-level statistics, the process will sum the number of blocks across these partitions, and this sum is the IO_COST metric.

With regard to bloom pruning, consider the situation where there is a join between partitioned fact and non-partitioned dimension tables, where the join key is the fact table's partition key. For example, consider the following query:

```
SELECT ... FROM FACT F, DIM D
WHERE F.PARTITION_KEY = D.KEY
and D.ATTRIBUTE < 1000;
```

This type of query will typically use bloom pruning to limit the scan of the fact table to partitions matching the join keys that are found when scanning the dimension table. Traditionally, bloom pruning is only performed when the query is executed, and therefore it is not accounted for in the optimizer cost model at all.

As such, when attempting to estimate the performance of empty partitioned tables with synthesized statistics using an optimizer, the conventional optimizer may therefore fail to account for the bloom pruning. For example, in a data warehousing environment, it is common for many queries to use bloom pruning. Therefore, the current processing should account for this pruning when computing estimated I/O for a candidate partition scheme.

To address this issue, the current embodiment implements a mechanism that runs a recursive query against the dimension table to find the join keys that will be produced. Given the join keys, the processing can find the partitions of the fact table that contain the join keys. Continuing with the above example, the following may be generated:

```
SELECT   DISTINCT   TBL$OR$IDX$PART$NUM
   (FACT, 0, 0, 0, D.KEY) FROM DIM D WHERE
   D.ATTRIBUTE<1000;
```

This query returns the set of partitions that bloom pruning will return. The current processing can generate this query even if there are no filter predicates on the dimension table.

After all candidates are processed, the processing at 516 will sort the candidates in a decreasing order of estimated I/O, and will use the top result as the suggested approach for the partition scheme.

Figure 6A:
FIGS. 6A-H provide an illustrative example of certain of the above-described processing steps.

FIGS. 6A-H provide an illustrative example of certain of the above-described processing steps. FIG. 6A shows an example table 602 that is currently not partitioned. This table 602 is a very simple structure having a single column ("Salary" column) that currently has ten rows.

Figure 6B:

FIG. 6B shows an example candidate partitioning scheme 604 that has been identified for table 602. In particular, candidate partition scheme 604 describes a range partitioning scheme having an interval of "2" and a first upper band identified as "2".

Figure 6C:
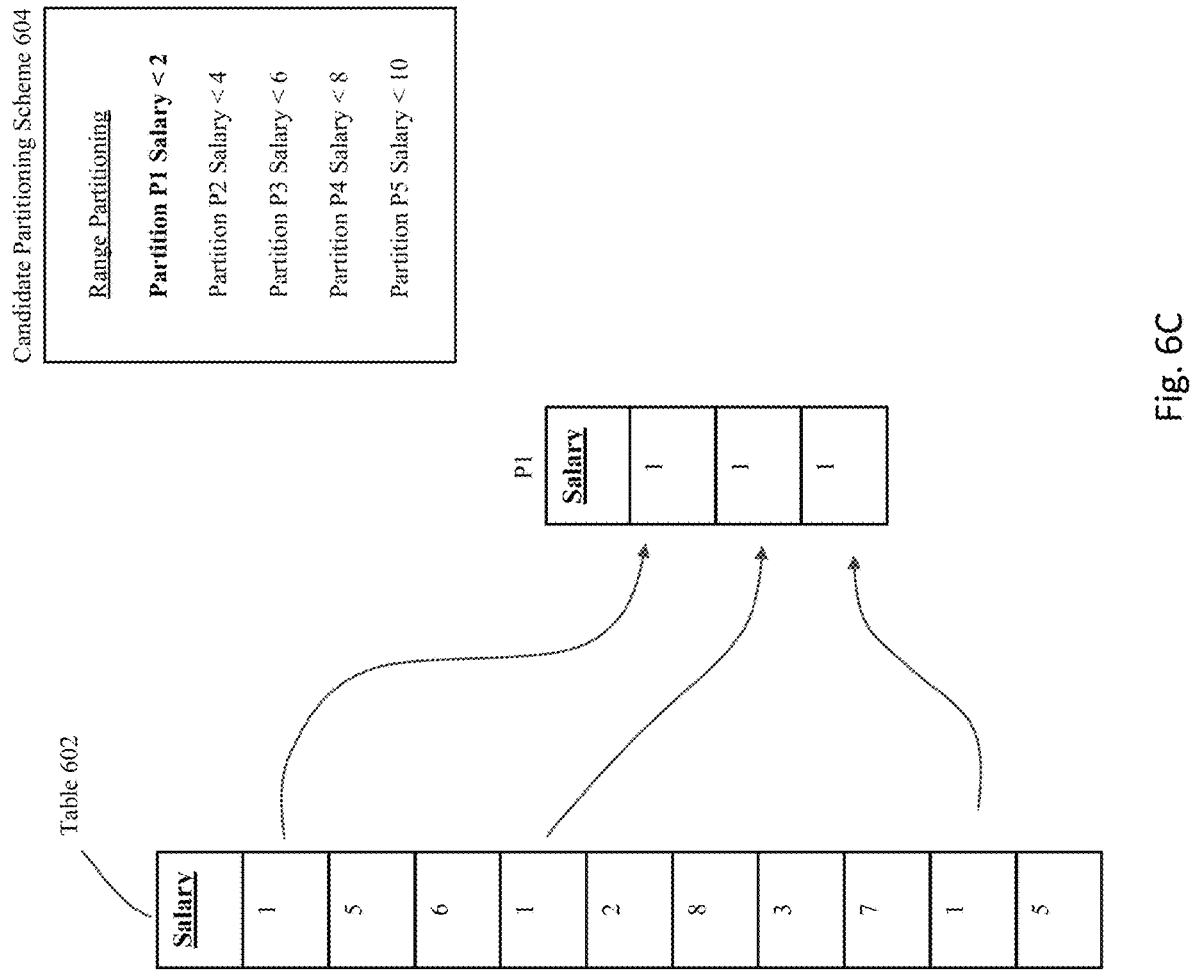
Figure 6D:
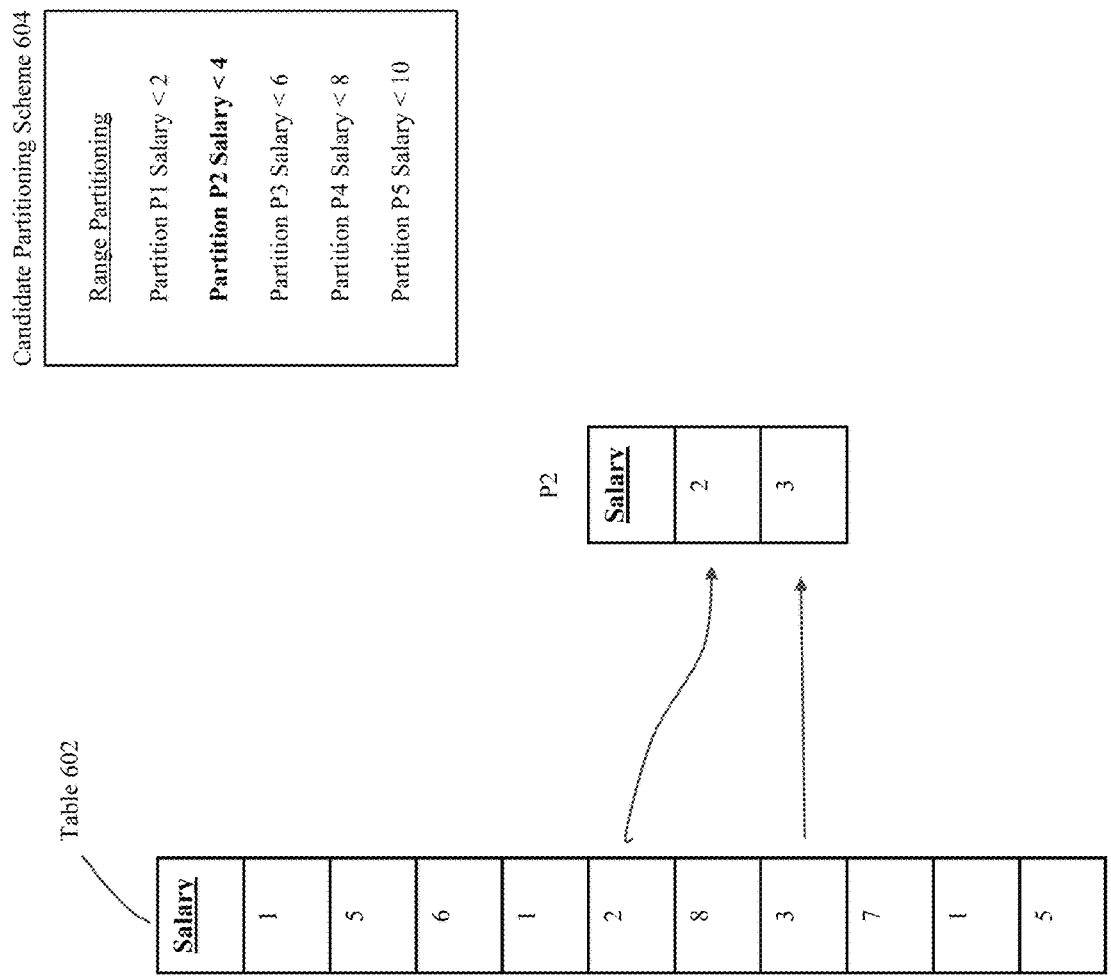
Figure 6E:
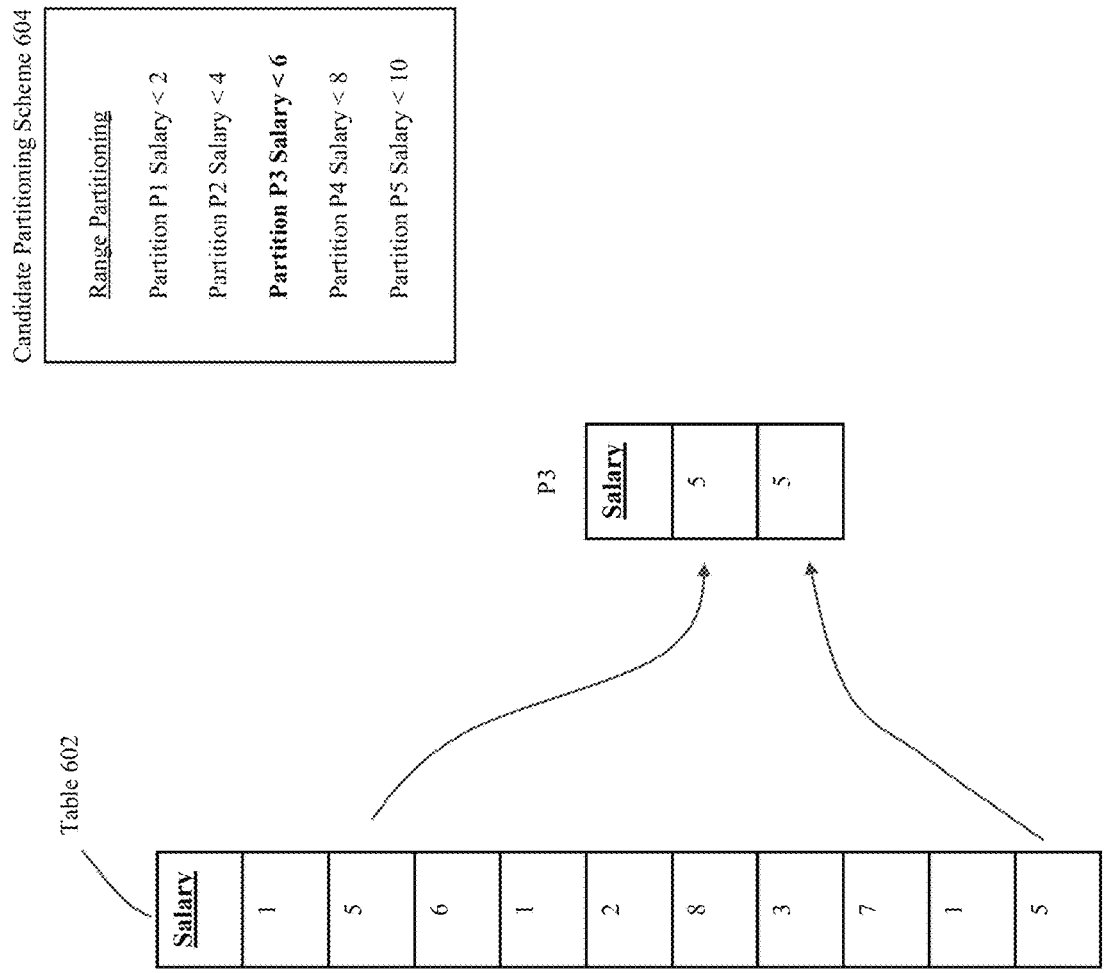
Figure 6F:
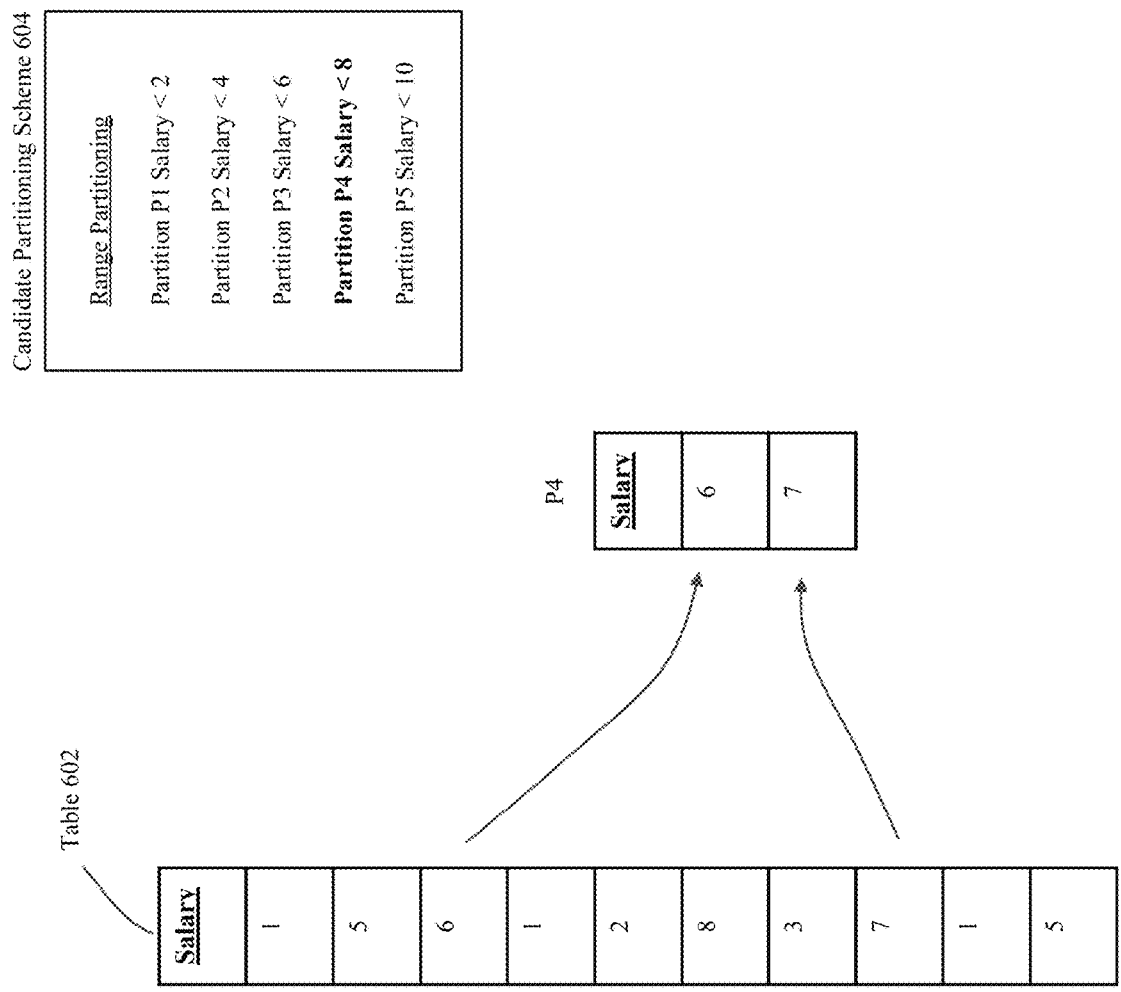
Figure 6G:
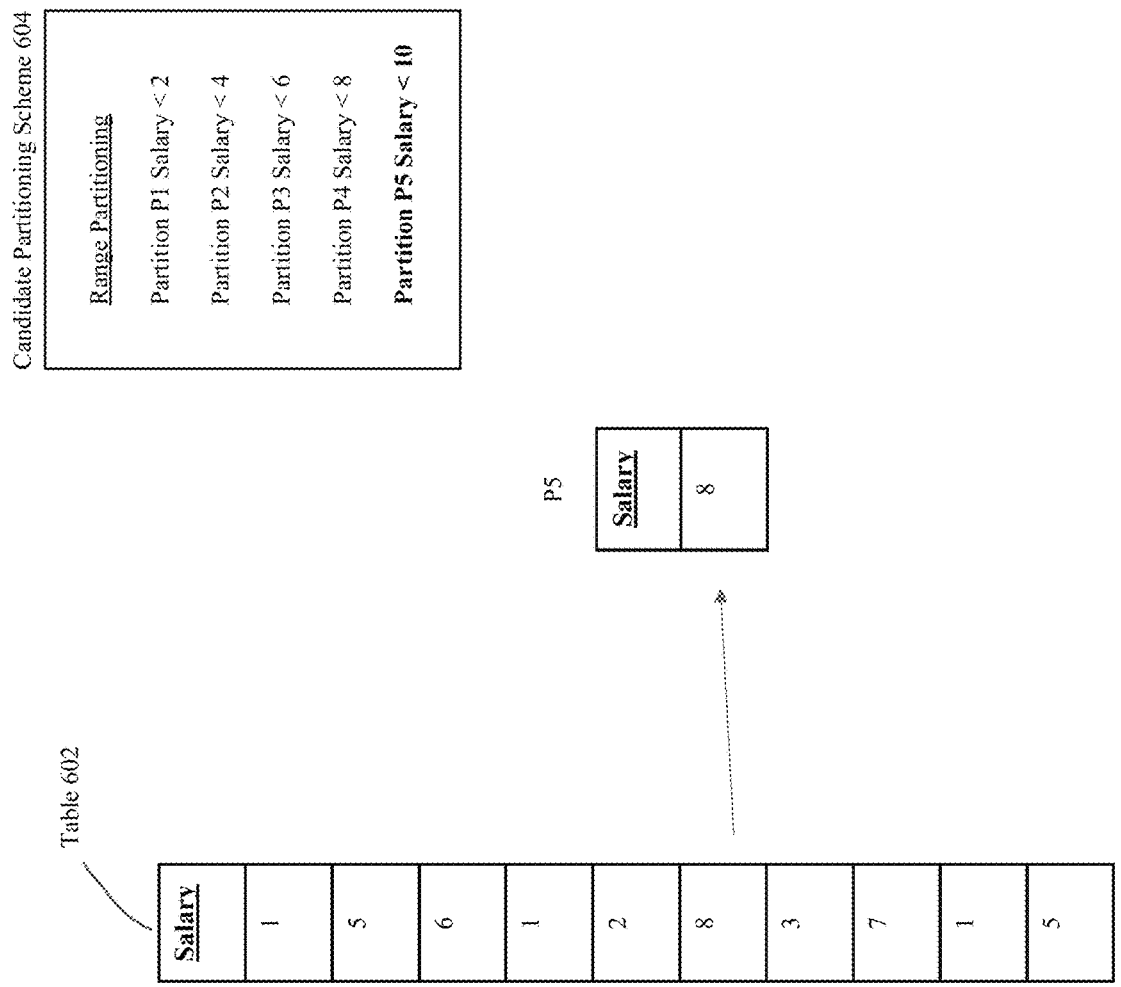

If this partitioning scheme is actually applied to the table 602, then the resulting partitions that result would exist as shown in FIGS. 6C-G. Specifically, as shown in FIG. 6C, partition P1 is defined to include all rows having a value in the Salary column that is less than the value "2", and hence the first, fourth, and ninth rows in table 602 would be used to populate partition P1. As shown in FIG. 6D, partition P2 is defined to include all rows having a value in the Salary column that is less than the value "4", and hence the fifth and seventh rows in table 602 would be used to populate partition P2. As shown in FIG. 6E, partition P3 is defined to include all rows having a value in the Salary column that is less than the value "6", and hence the second and tenth rows in table 602 would be used to populate partition P3. As shown in FIG. 6F, partition P4 is defined to include all rows having a value in the Salary column that is less than the value "8", and hence the third and eighth rows in table 602 would be used to populate partition P4. Finally, as shown in FIG. 6G, partition P5 is defined to include all rows having a value in the Salary column that is less than the value "10", and hence only the sixth row in table 602 would be used to populate partition P5.

Figure 6H:
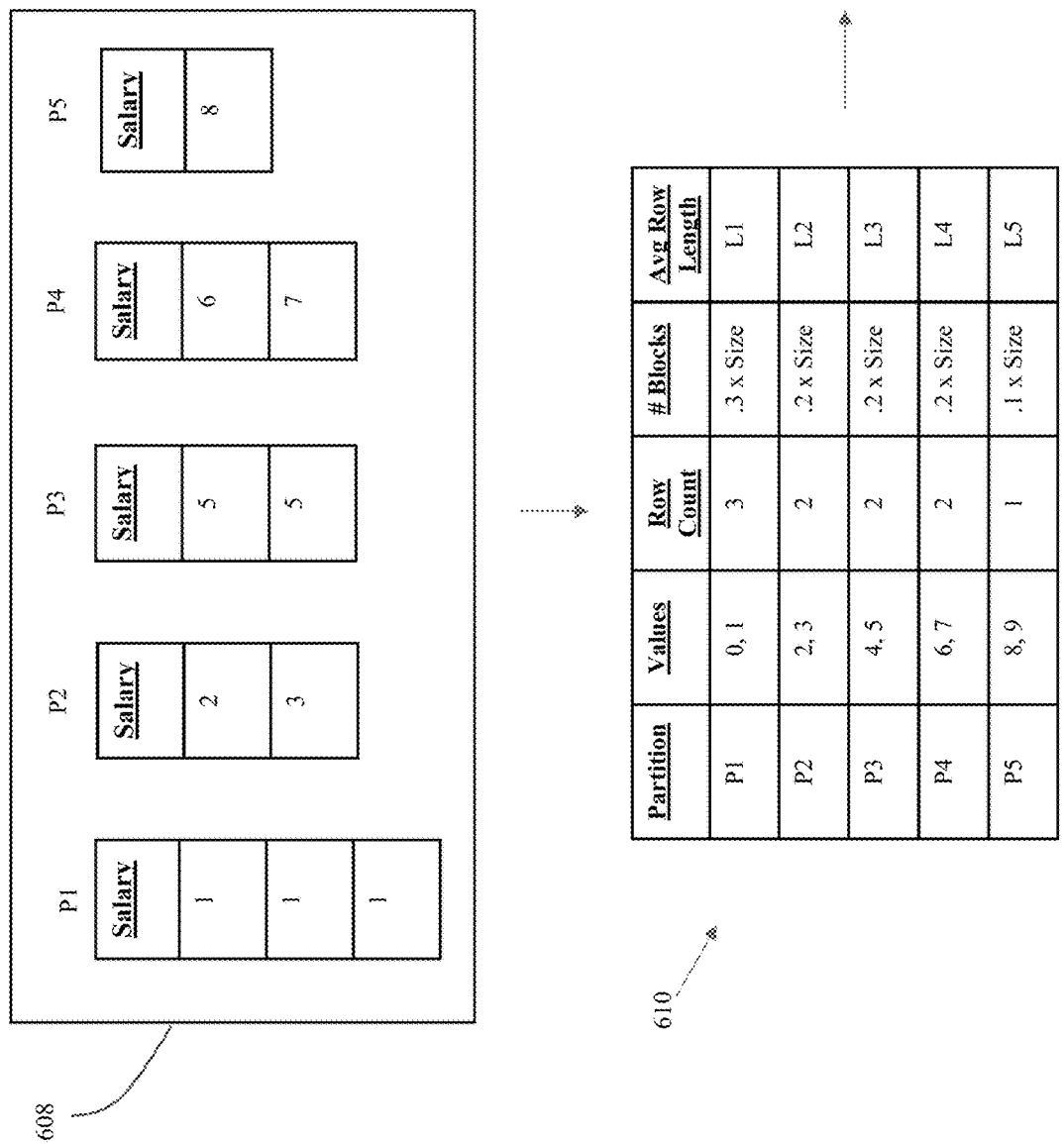

For purposes of the current invention, the empty partitions will remain "empty" and not actually be populated with the real data. Instead, as shown in FIG. 6H, the data from the original table 602 will be logically analyzed as if the partitions are actually populated as shown in 608, but will really only be used to synthesize a set of statistics such as the statistics 610 shown in the figure. These partition-level statistics 610 will, on a partition basis, identify the number of rows from the original table 602 that would be placed into each partition if the partitions are actually populated with the original data. For example, the third column in table 610 identifies the number of rows for each partition in the candidate partition scheme. Based upon the synthesized statistics, one or more performance metrics may be established for the candidate partition scheme. For example, as shown in the fourth column of statistics 610, the number of blocks corresponding to each partition may be estimated by calculating the relative percentage of the rows for a given partition, and multiplying by the size (S) for the database object. In this way, using partition-level statistics, the process can sum the number of blocks across the partitions for the candidate partition scheme, and this sum can be used to provide a IO_COST metric for evaluating the partition scheme. In some embodiments, the summing process to obtain the IO_COST is across partitions that will be scanned by each query, where due to partition pruning, not all partitions will be scanned. Based upon the IO_COST metrics for each scheme, the scheme having the best estimated performance in terms of I/O can be identified as the specific scheme to implement for the next stage of processing.

Figure 7:
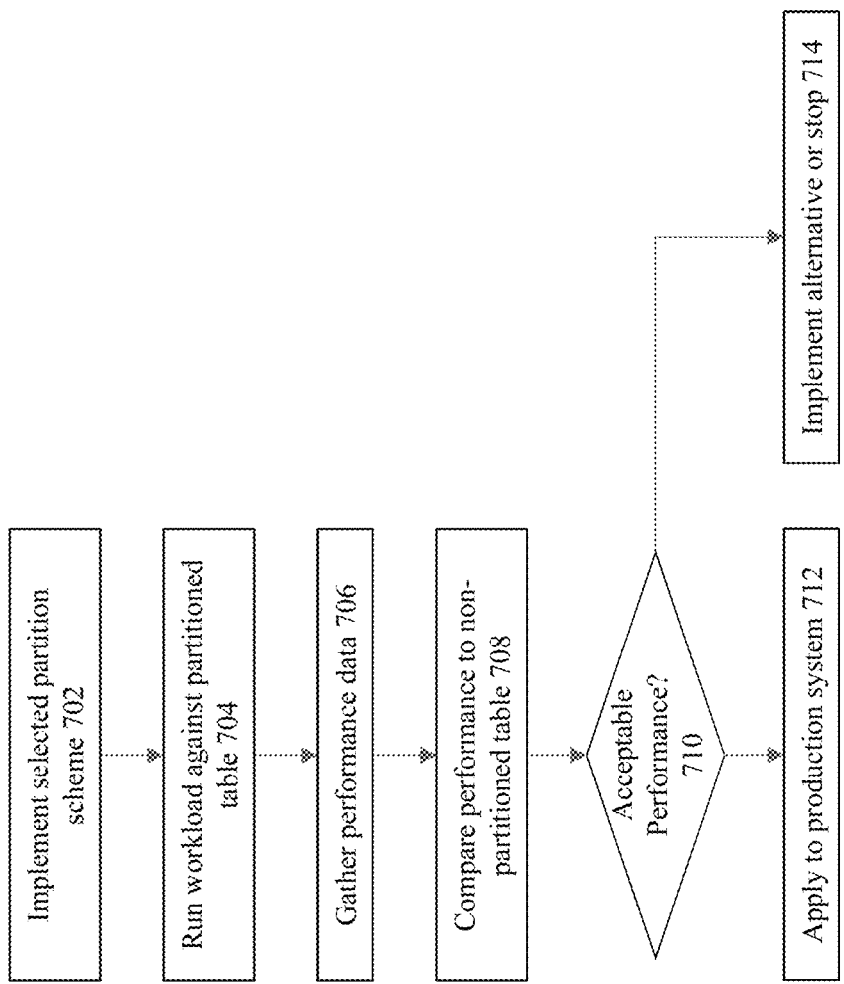
FIG. 7 shows a flowchart of an approach to implement a candidate partition scheme and to verify the benefits of the selected scheme.

FIG. 7 shows a flowchart of an approach to implement a candidate partition scheme and to verify the benefits of the selected scheme. At 702, the processing will implement the selected partitions scheme as realized partitioned tables that are populated with the production data. At 704, the real user workloads are then run against the partitioned table. The performance data for the execution of the workload is then gathered at 706.

With this current embodiment, to evaluate performance, an optimistic approach can be taken—where the assumption is that the candidate is going to be accepted. In this case, a modification is made to the existing non-partitioned table to use the candidate partition scheme, and the optimizer feature described above will be enabled for all existing queries, to avoid potential performance regressions. The approach validates queries by running them against the partitioned table, allowing the optimizer to generate a new plan. Once demonstrated that there is no regression, the system allows the query to execute with new plan for the user. After all queries are evaluated, the results are aggregated to quantify the benefit of the partition scheme for all queries in the workload.

At step 708, the performance data for the partitioned table is then compared against the performance data for the original table (e.g., the non-partitioned table). A determination is made at 710 whether the partitioned table provide sufficient benefits such that the partitioning scheme should be retained. In some embodiments, the performance improvements should increase at least by 20% to be considered to provide sufficient benefits to retain the proposed partitioning scheme. If the performance of the partitioning scheme is considered acceptable, then it is retained at step 712. Otherwise, at 714, the partitioning scheme is removed, and/or another scheme is selected as a replacement from the set of candidate schemes.

This document will now described additional optimizations pertaining to autonomous implementations for interval/range partitioning. The issue being addressed is that conventional approaches to implement interval partitioning may not operate correctly when used for autonomous partitioning. As previously discussed, interval partitioning is an approach to create partitions in a range partitioned table as data is inserted. In some implementations, this approach includes two implicit constraints for the partition key of an interval partitioned table: (i) the partition key column is not nullable; and (ii) the partition key column has an implicit upper limit. In other words, some conventional approaches to implement interval partitioning are unable to have a null value for the partition key, and are also unable to handle values that exceed the upper limit for the value. For an application developer where data in the table can be anticipated, these implicit constraints are generally not a problem. But in an autonomous environment where data is unpredictable and can change in arbitrary ways over time, these constraints can prevent the system from using interval partitioning for a user's table.

It is noted that the partition layer may internally use partition numbers to identify partitions. For example, partition pruning works by finding the set of partitions that are relevant for the query, and returning these partition numbers to the row source that does the scan.

The limitations with conventional intervals are caused by implementation approaches where partition numbers are linked with the values that are in the partition. Conceptually, if value X goes into partition number Y, then value X*10 goes into partition number Y*10. This is true even if there is no data between X and X*10. However, partition numbers are a finite resource which may be limited. Therefore, the decision to assign partition numbers based on the data in the partition has the consequence of implicitly limiting the max value that one can support for the partition key. Since NULLs sort high, this also means one cannot insert a NULL for the partition key.

Embodiments of the present invention provide an approach to perform automatic interval partitioning that resolves these issues, where the inventive concept implements interval partitioning that does not impose these implicit constraints on the partition key column.

Figure 8:
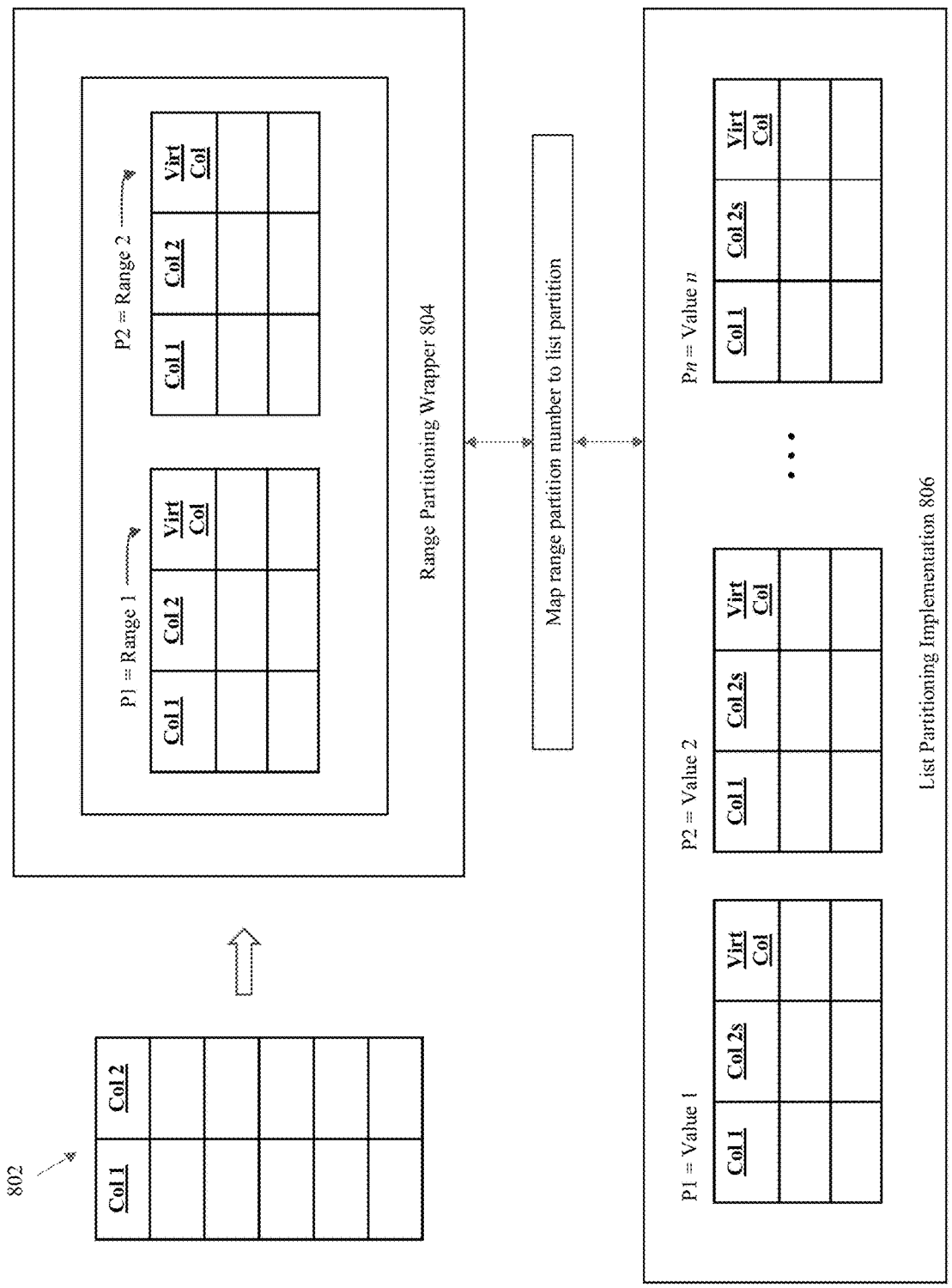
FIG. 8 illustrates certain embodiments of the invention where an automatic interval is established such that the partition numbers are not linked directly to the data in the partition.

As illustrated in FIG. 8, with certain embodiments of the invention, an automatic interval is established where the partition numbers are not linked directly to the data in the partition. Instead, the approach uses auto-list partitioning functionality 806 under the covers, which provides the ability to map a single value to a partition number, as a layer of indirection between the data in the partition and the partition number.

Specifically, a range wrapper layer 804 is overlaid above interval partitions that is imposed over a base table 802. Internally, the underlying data is actually implemented as list partitions 806. A mapping layer is logically employed to map the range partitions to the list partitions.

Figure 9:
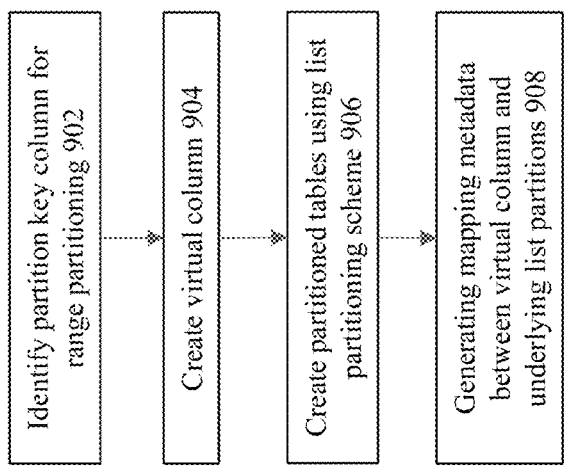
FIG. 9 shows a flow chart of a process to set up and implement the automatic interval partitioning according some embodiments of the invention.

FIG. 9 shows a flow chart of a process to set up and implement the automatic interval partitioning according some embodiments of the invention. At 902, a partition key column is identified for the intended range partitioning. A range-based partitioning scheme is configured for the database table.

As part of the schema configuration for the range-based partitions, a "virtual column" is created for each range partitioned table at step 904. A virtual column appears to logically be the same as any other column in a table, but the value in the virtual column is derived or generated by an expression rather than being stored in a physical way. The virtual column is used to store a key value for a range-based partition, which represents a canonical value for a given interval.

However, under the covers, at step 906, the actual table structures that are used to hold the data are implemented as list-based partitions. At 908, a mapping layer is employed to map the interval-based partitioning key to the underlying list-based partitions.

As noted above, a virtual column is added to the original user's table and an empty partitioned table is created with the automatic interval scheme that is being evaluated. This means that the current approach may potentially affect the user's original table/application in some way before the partitioning scheme has been evaluated as being useful or not. To address this issue, some embodiments provide an approach to allow the system to directly partition by using an expression.

To explain, consider that one possible approach to create an table for scoring/evaluating a partition scheme, is to employ the following:

```
create table y (a int);
insert into y values (1);
insert into y values (100);
insert into y values (123);
commit;
alter table y add (vc invisible as (sys_op_interval_high_bound(a, 100, 0)));
```

-continued

```
create table yexch partition by list(vc) automatic (partition p_null values
(null)) for exchange with table y;
```

With the current approach to partition by expression, this example can now be implemented using the following:

```
create table y (a int);
insert into y values (1);
insert into y values (100);
insert into y values (123);
commit;
create table yexch partition by list(sys_op_interval_high_bound(a,
100, 0)) automatic
(partition p_null values (null)) for exchange with table y;
```

Using this approach, the table can now be created without affecting the original user's table in any way since the virtual column is being created automatically as part of the create table DDL. This same idea can also be used when actually implementing the partitioning scheme on the original table after validating the partitioning scheme on the user's workload:

```
alter table y modify partition by list (sys_op_interval_high_bound(a,
100, 0))
automatic
(partition p_null values (null));
```

This alter table DDL will automatically create the virtual column internally. There is no need for an extra step of adding the VC beforehand and then partitioning the table.

In addition, when a partition key is mapped to an interval, a canonical value is chosen for the interval, and this canonical value is used with auto-list partitioning to find the partition. For consistency with range partitioning, the approach chooses the interval's upper bound as the interval's canonical value. For example, if the interval size is 100, the value 123 would map to the interval [100, 200) and the canonical value for this interval is 200. Conceptually this would be similar to auto-list partitioning with a virtual column.

The following is a syntax example with an initial partition and no definition of a fix point:

```
CREATE TABLE AUTO_INTERVAL(i int, j int,
    canonical_i
    generated always as
        (AUTO_INTERVAL_CANONICALIZE(i, 100))
PARTITION BY LIST(canonical_i) AUTOMATIC
(PARTITION P_NULL VALUES (NULL));
```

With list partitioning, there is no requirement that partitions are ordered by their values, nor do the inventive approach require partition number gaps between partitions that have gaps in their values. So, when partitions are created for N intervals, the approach will use partition numbers 1 . . . N, even if one interval is #1 and another is #1,000,000,000.

It is noted that that HIGH_VALUE in the catalog views would be the same for conventional interval and automatic interval tables. Other than that, this approach expresses an interval that is used for the canonical calculation, it does not require or define whether this interval will start with 0, 1, or any other arbitrary value.

Some embodiments pertain to an automatic interval without a range section. Since the approach is not limited by partition numbers, it is possible to support automatic interval without any range partitions or any user-specified anchor for interval computation. However, a fix point can be used for proper calculation of the interval boundaries, similar to the transition point in interval partitioned tables. For numeric date types, one could calculate intervals starting from an arbitrary number, such as 0. For date/time data types, one could calculate intervals starting from an arbitrary date such as Jan. 1, 2000. Notice that an auto interval has no problem handling values preceding the anchor; the value −1234 would map to interval [−1300, −1200) which has canonical value −1200, and this interval is just as valid as any other interval.

Some embodiments could use approaches such as the following syntax to create an automatic interval partitioned table without range partitions, where the following is a syntax example with no initial partition and no definition of a fix point:

```
CREATE TABLE AUTO_INTERVAL(i int, j int)
PARTITION BY RANGE(i) INTERVAL (100) AUTOMATIC;
```

Unlike the earlier syntax, this does not express a single partition at initial table creation time. This syntax would create a table with one partition for NULL values, irrespective of whether the partition key would be nullable or not. There is no transition point, or distinction between range partitions and interval partitions—all partitions in the table are interval partitions.

Upon dropping the final range partition of a conventional interval partitioned table, one could implicitly convert the table to an automatic interval partitioned table.

There are numerous advantages with the current embodiments of automatic interval compared to conventional interval, including: (1) No implicit NOT NULL constraint for partition key (2) No implicit upper limit for partition key (3) with interval partitioning without range partitions then DROP PARTITION does not requires partition renumbering (4) Partitions can be created (ADD PARTITION) at any point in time.

In terms of an implementation approach, some embodiments comprise partition logic to map a partition key to an interval number, and then uses a hash table to get a partition number for this interval number. The system can handle range predicates in the interval section. For this, an approach can be taken similar to the one used for list partitioning, with the following data structures: (a) sorted array of partition bounds in the interval section, and/or (b) parallel array of the partition number.

A search in these data structures differs from a list partitioning search because the interval size is relevant, e.g., if predicate is col <X, and interval size is I, then return partitions with high bound <(X+I).

List partitioning may produce non-contiguous sets of partitions for range predicates, and this same approach can be used for range predicates in auto-interval tables. When materializing a new partition, the system can use auto-list approach logic where partitions are identified by key value, not an interval approach where partitions are identified by partition number.

Some embodiments provide an approach to implement a definition of fix point for interval calculation—explicit or implicit. The fix point for interval calculation can be set implicitly or made user-controllable. Assuming that this functionality will become autonomous-only, an implicit definition can be implemented and/or become mandatory. In some implementations, the user should not be required to make the data placement decision (they can do so with explicitly controlled partitioning as in unmanaged environments). The implicitly declared fix points can be: (a) 0 for numeric values, and/or (b) First day of a calendar year for date/timestamp columns.

Therefore, what has been described is an improved approach to perform automatic partitioning, without requiring any expertise on the part of the user. A three stage processing pipeline is provided to generate candidate partition schemes, to evaluate the candidate using real table structures that are empty, and to then implement a selected scheme with production data for evaluation.

In addition, what has been described is an improved approach to perform automatic interval partitioning, where the inventive concept implements interval partitioning that does not impose these implicit constraints on the partition key column. The approach can automatically capture the user's workload as it is running. In addition, the new partition method can be used to interval partition a table when future data cannot be predicted. The recommendation can be validated by executing the workload against the partitioned table before applying the recommendation in the user's environment.

System Architecture

Figure 10:
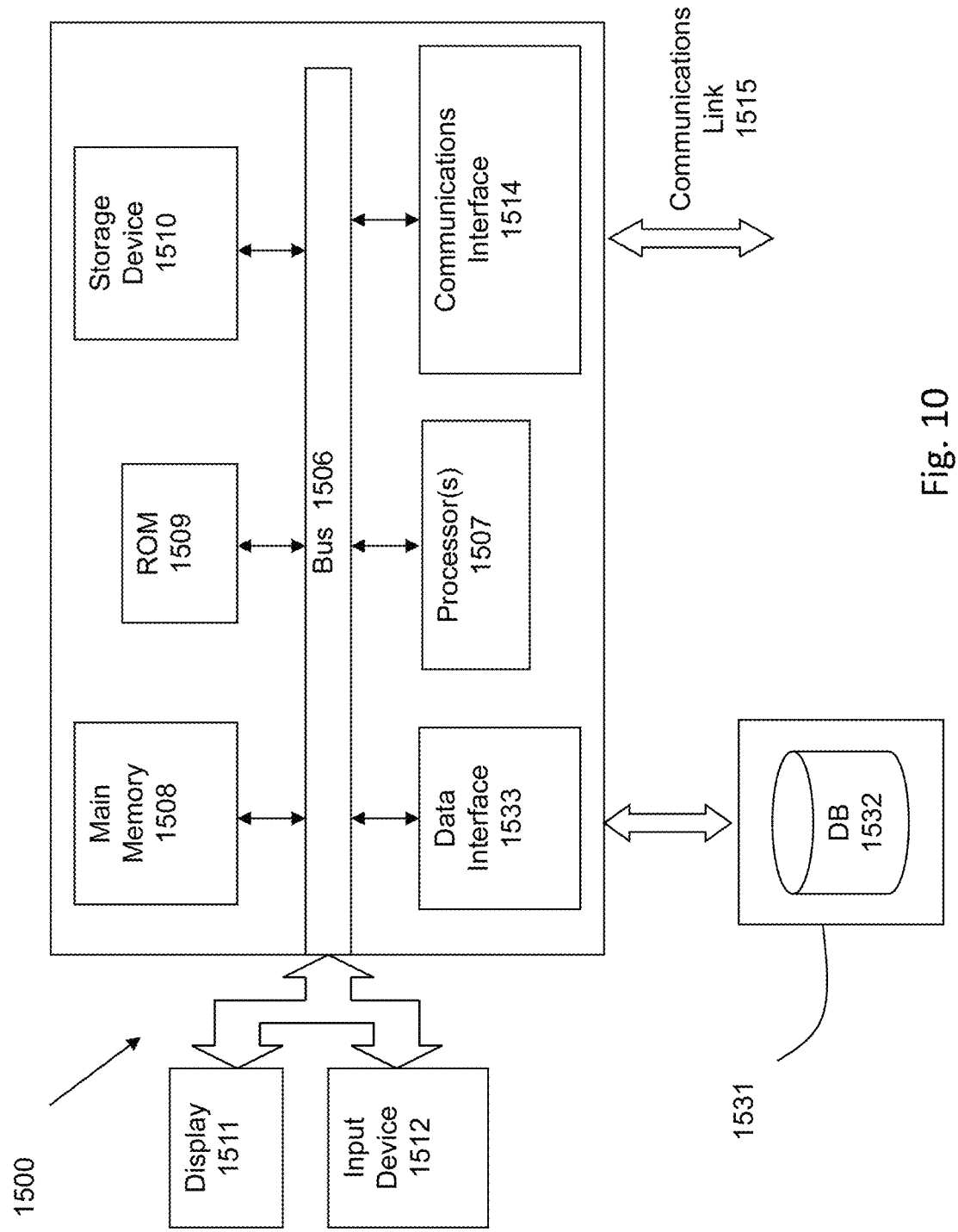
FIG. 10 is a block diagram of an illustrative computing system suitable for implementing an embodiment of the present invention.

FIG. 10 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 11:
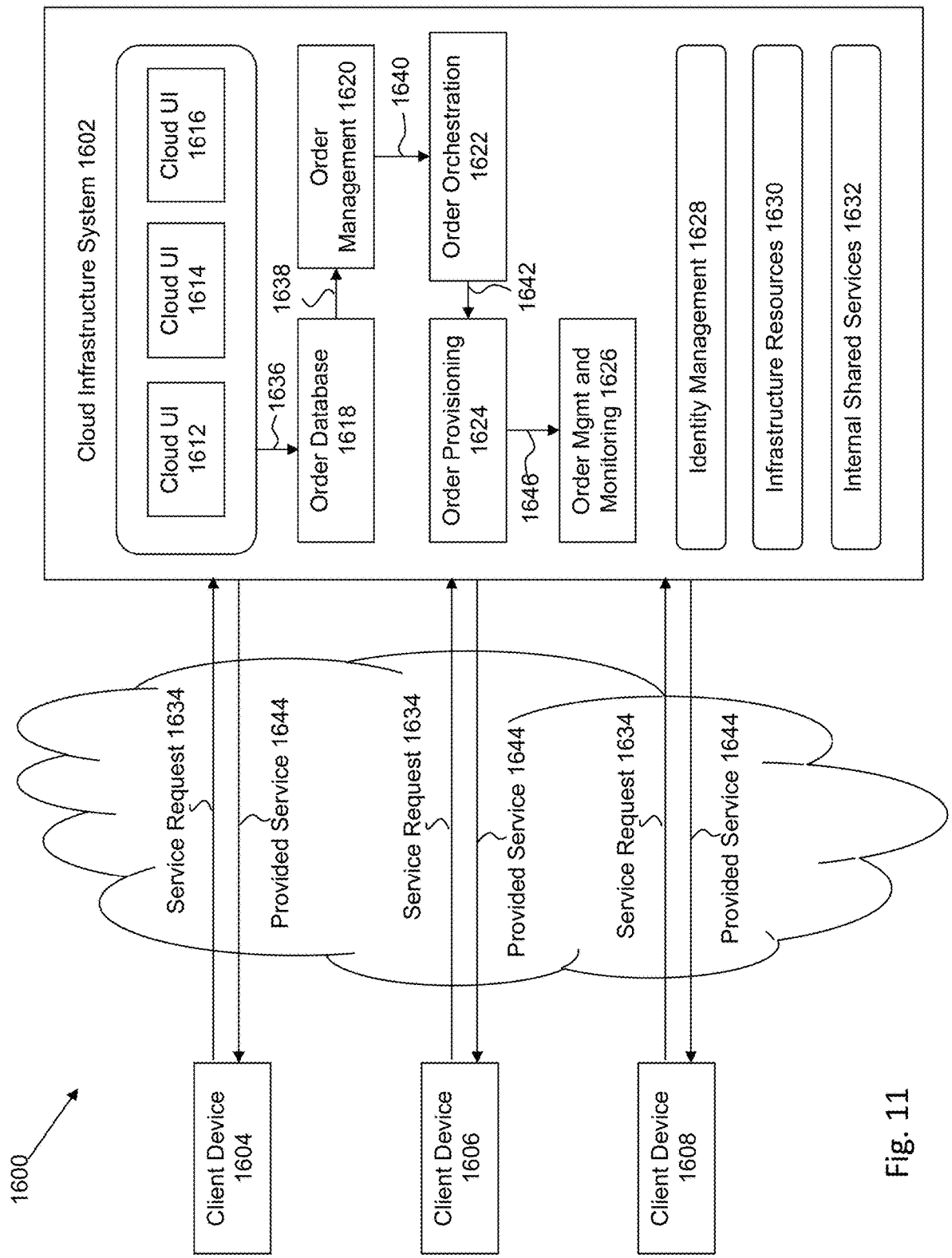
FIG. 11 is a block diagram of one or more components of a system environment in which services may be offered as cloud services, in accordance with an embodiment of the present invention.

FIG. 11 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for FIG. 10. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloudservices via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:
1. A method, comprising:
   identifying a database table comprised of a plurality of rows and columns;
   generating a plurality of candidate partition schemes for the database table, wherein
      a given candidate partition scheme from among the plurality of candidate partition schemes is based at least in part on cardinality data that corresponds to a number of distinct values within a specific column of a plurality of columns;

creating empty partitions for at least some candidate partition schemes of the plurality of candidate partition schemes;

generating synthesized statistics for the empty partitions, wherein the synthesized statistics are based at least in part upon correlation of the plurality of rows of the database table to partitions of the candidate partition schemes, and the synthesized statistics comprise estimated row data for the empty partitions of the candidate partition schemes; and evaluating the candidate partition schemes based at least in part on the synthesized statistics to identify a selected partition scheme for the database table.

2. The method of claim 1, further comprising implementing the selected partition scheme in a production database environment and running a production workload against a partitioned table in the production database environment.

3. The method of claim 1, wherein the candidate partition schemes are generated by:

identifying a query in a production workload;
analyzing the query to identify predicate data for the query;
using the predicate data and cardinality data to identify the candidate partition schemes; and
scoring the candidate partition schemes to select one or more of the candidate partition schemes.

4. The method of claim 3, wherein scoring of the candidate partition schemes is based upon a number of predicates corresponding to each of the candidate partition schemes.

5. The method of claim 1, wherein filtering is applied to remove one or more possible candidate partition schemes based upon cardinality data.

6. The method of claim 1, wherein the synthesized statistics are generated by querying the database table and analyzing query results to determine a number of rows from the database that would be associated with specific partitions for the candidate partition schemes.

7. The method of claim 1, wherein interval partitioning is logically implemented as one of the candidate partition schemes, where list partitioning is an underlying storage structure for the interval partitioning.

8. The method of claim 7, wherein the interval partitioning is implemented using a virtual column that holds a canonical partition key that maps to the list partitioning.

9. A system for partitioning in a database system, comprising:

a processor;
a memory for holding programmable code; and
wherein the programmable code includes instructions executable by the processor for
identifying a database table comprised of a plurality of rows and columns;
generating a plurality of candidate partition schemes for the database table, wherein
a given candidate partition scheme from among the plurality of candidate partition schemes is based at least in part on cardinality data that corresponds to a number of distinct values within a specific column of a plurality of columns;
creating empty partitions for at least some candidate partition schemes of the plurality of candidate partition schemes;
generating synthesized statistics for the empty partitions, wherein
the synthesized statistics are based at least in part upon correlation of the plurality of rows of the database table to partitions of the candidate partition schemes, and the synthesized statistics comprise estimated row data for the empty partitions of the candidate partition schemes; and
evaluating the candidate partition schemes based at least in part on the synthesized statistics to identify a selected partition scheme for the database table.

10. The system of claim 9, wherein the programmable code further comprises instructions for implementing the selected partition scheme in a production database environment and running a production workload against a partitioned table in the production database environment.

11. The system of claim 9, wherein the programmable code further comprises instructions for generating the candidate partition schemes by:

identifying a query in a production workload;
analyzing the query to identify predicate data for the query;
using the predicate data and cardinality data to identify the candidate partition schemes; and
scoring the candidate partition schemes to select one or more of the candidate partition schemes.

12. The system of claim 11, wherein scoring of the candidate partition schemes is based upon a number of predicates corresponding to each of the candidate partition schemes.

13. The system of claim 9, wherein filtering is applied to remove one or more possible candidate partition schemes based upon cardinality data.

14. The system of claim 9, wherein the synthesized statistics are generated by querying the database table and analyzing query results to determine a number of rows from the database that would be associated with specific partitions for the candidate partition schemes.

15. The system of claim 9, wherein interval partitioning is logically implemented as one of the candidate partition schemes, where list partitioning is an underlying storage structure for the interval partitioning.

16. The system of claim 15, wherein the interval partitioning is implemented using a virtual column that holds a canonical partition key that maps to the list partitioning.

17. A computer program product embodied on a non-transitory computer readable medium, the computer readable medium having stored thereon a sequence of instructions, which when executed by a processor executes implementation of partitions in a database system, comprising:

identifying a database table comprised of a plurality of rows and columns;
generating a plurality of candidate partition schemes for the database table, wherein
a given candidate partition scheme from among the plurality of candidate partition schemes is based at least in part on cardinality data that corresponds to a number of distinct values within a specific column of a plurality of columns;
creating empty partitions for at least some candidate partition schemes of the plurality of candidate partition schemes;
generating synthesized statistics for the empty partitions, wherein
the synthesized statistics are based at least in part upon correlation of the plurality of rows of the database table to partitions of the candidate partition schemes, and the synthesized statistics comprise estimated row data for the empty partitions of the candidate partition schemes; and evaluating the candidate partition schemes based at least in part on the synthesized statistics to identify a selected partition scheme for the database table.

18. The computer program product of claim 17, wherein the computer program product further comprises instructions for implementing the selected partition scheme in a production database environment and running a production workload against a partitioned table in the production database environment.

19. The computer program product of claim 17, wherein the computer program product further comprises instructions for generating the candidate partition schemes by:

identifying a query in a production workload;

analyzing the query to identify predicate data for the query;

using the predicate data and cardinality data to identify the candidate partition schemes; and scoring the candidate partition schemes to select one or more of the candidate partition schemes.

20. The computer program product of claim 19, wherein scoring of the candidate partition schemes is based upon a number of predicates corresponding to each of the candidate partition schemes.

21. The computer program product of claim 17, wherein filtering is applied to remove one or more possible candidate partition schemes based upon cardinality data.

22. The computer program product of claim 17, wherein the synthesized statistics are generated by querying the database table and analyzing query results to determine a number of rows from the database that would be associated with specific partitions for the candidate partition schemes.

23. The computer program product of claim 17, wherein interval partitioning is logically implemented as one of the candidate partition schemes, where list partitioning is an underlying storage structure for the interval partitioning.

24. The computer program product of claim 23, wherein the interval partitioning is implemented using a virtual column that holds a canonical partition key that maps to the list partitioning.

* * * * *

UNITED STATES PATENT AND TRADEMARK OFFICE
CERTIFICATE OF CORRECTION

PATENT NO. : 11,531,704 B2
APPLICATION NO. : 16/948303
DATED : December 20, 2022
INVENTOR(S) : Eadon et al.

It is certified that error appears in the above-identified patent and that said Letters Patent is hereby corrected as shown below:

On the Title Page

Item (73), Column 1, under Assignee, Line 1, delete "Corporation" and insert -- Corporation, (US) --, therefor.

On page 2, item (56), Column 1, under Other Publications, Line 7, delete ""SMOPO-C:" and insert -- "SMOPD-C: --, therefor.

In the Specification

In Column 9, Line 9, delete "action(s)" and insert -- action(s), --, therefor.

In Column 9, Line 31, delete "statement." and insert -- statement, --, therefor.

In Column 9, Line 35, delete "cost," and insert -- cost --, therefor.

In Column 17, Line 41, delete "[100, 200)" and insert -- (100, 200) --, therefor.

In Column 17, Line 62, delete "that that" and insert -- that --, therefor.

In Column 18, Line 13, delete "[-1300, -1200)" and insert -- (-1300, -1200) --, therefor.

Signed and Sealed this
Fifth Day of September, 2023

Katherine Kelly Vidal
*Director of the United States Patent and Trademark Office*